May 15, 1951 H. J. ADLER ET AL 2,552,757

PHONOGRAPH START-STOP SWITCH

Filed May 2, 1946 3 Sheets-Sheet 1

Inventors

Harold J. Adler

Matthew Z. Mroz

By Spencer, Marzall, Johnston & Cook attys

Inventor
Harold J. Adler
Matthew Z. Mroz
By Spencer, Marzall, Johnston & Cook
Attys.

PHONOGRAPH START-STOP SWITCH

Filed May 2, 1946 3 Sheets-Sheet 3

Inventor
Harold J. Adler
Matthew Z. Mroz
By: Spencer, Marzall, Johnston & Cook
Att'ys.

Patented May 15, 1951

2,552,757

UNITED STATES PATENT OFFICE 2,552,757

PHONOGRAPH START-STOP SWITCH

Harold J. Adler, Chicago, and Matthew Z. Mroz, Park Ridge, Ill., assignors to Sentinel Radio Corporation, Evanston, Ill., a corporation of Illinois Application May 2, 1946, Serial No. 666,675

1 Claim. (Cl. 274—2)

This invention relates in general to phonographs, and more particularly to a combination radio and phonograph, embodying a pickup arm which carries a stylus or needle that contacts and travels over the record.

Heretofore, in devices of this character, which are usually housed within a cabinet containing a lid, which latter is generally closed during the playing of a record, when it is desired to change the record, the lid is raised and the operator then moves the pickup or stylus carrying arm out of engagement with the record, and out of the way, to permit the placing of a record on the revolving table. The pickup arm and stylus are then placed in position by the operator with respect to the record, and the control switch operated to start the table driving motor.

It is one of the objects of the present invention to provide, in a device of this character, means whereby all operations normally performed by the operator, except the opening of the cabinet and the placing of the record on the turn-table, will be eliminated.

Another object is to provide improved means whereby, when the cabinet is opened, that is, the lid raised, the pickup arm will be automatically shifted to move the stylus out of engagement with the record, and out of the way, so as not to interfere with the reversing of the record, or with its removal and the substitution of another record.

A further object is to provide improved means whereby the mechanism may be readily adjusted to compensate different sizes of records.

A further object is to provide improved means whereby, when the pickup or stylus carrying arm has reached a predetermined position with respect to the record, the turn-table operating motor will be stopped.

A further object is to provide improved means whereby, when the lid or closure for the case or cabinet is opened, the stylus carrying arm will be automatically and correctly positioned for starting in the first groove of the record, when the lid or closure is lowered or moved into closing position.

A still further object is to provide improved means for controlling the motor, and improved means for cutting off the motor when the stylus reaches the end of the record, which means automatically resets itself when the lid is closed.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings exemplifying this invention, in which Fig. 1 is a perspective view of an apparatus of this character, constructed in accordance with the principles of this invention, and with the lid or closure in an open position.

Figure 1:
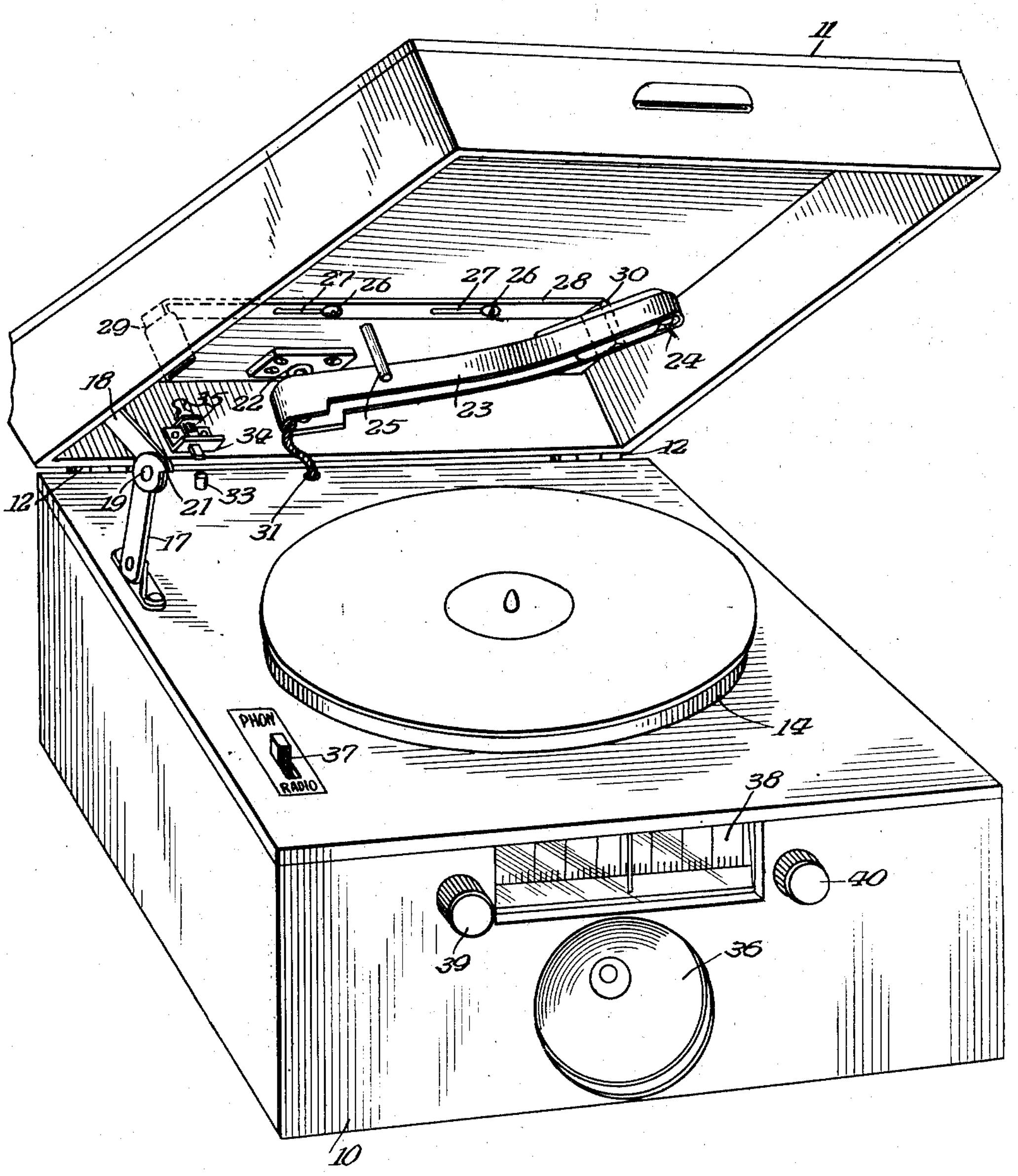

Referring more particularly to the drawings, the numeral 10 designates a case or housing, having a lid or closure 11 connected thereto by suitable hinges 12, the lid being hollow. Within the case is a motor 13, for rotating the record carrying turn-table 14 in any well-known manner, such as by means of a worm 15, engaging a worm gear 16 which is connected to the turn-table.

The lid 11 may be supported in its open position in any suitable manner, such as by means of links 17—18 pivotally connected, as at 19, the free ends of the links being, respectively, pivotally connected to the lid, and to a suitable support 20, co-operating shoulders 21 being provided on the links to limit the opening movement of the lid. Within the lid 11, and pivotally mounted adjacent one of its ends, as at 22, is a pickup or stylus carrying arm 23, which may be of any suitable construction and configuration, and which carries a stylus or needle 24 at its other end. This arm is mounted to swing on an axis perpendicular to the lid, and a stop 25 may be provided for limiting the movement of the arm about its pivot in one direction.

Adjustably mounted within the lid 11, preferably by means of screws and slots 26, 27, is a member or bar 28, the ends of which are deflected at right angles to the body portion, as at 29, 30. The screws and slots 26, 27 are so arranged as to serve as stops for limiting the movement of the member 28, and for selectively positioning the end 30 of the member, to be engaged by the arm 23, according to the size or diameter of the record to be played.

Figure 2:
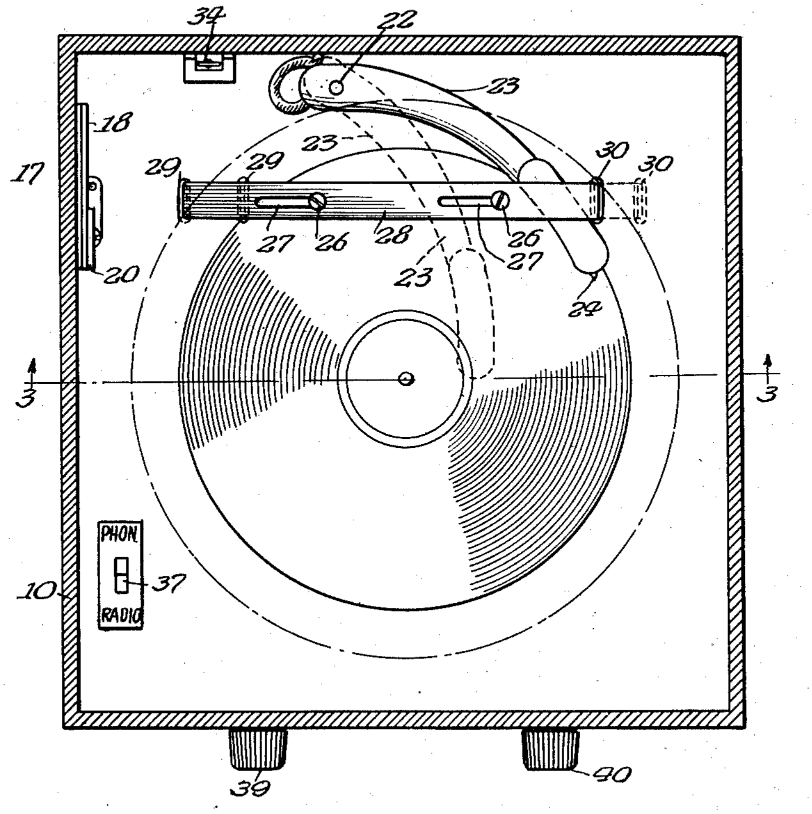
Fig. 2 is a horizontal sectional view taken on line 2—2, Fig. 3.
Figure 3:
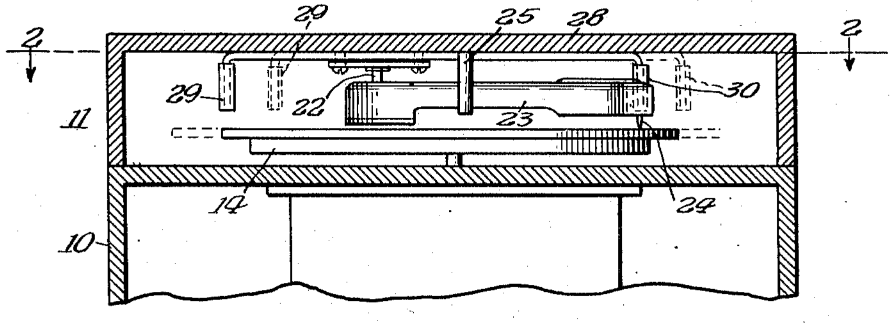
Fig. 3 is a vertical sectional view taken on line 3—3, Fig. 2.

By moving the member 28 to the left, in Figs. 1 and 2, until one end of the slots engages the screws, the end 30 will be positioned to be engaged by the arm 23, to position the stylus 24 to play, say, a 10-inch record. By moving the member 28 to the right, in said figures, until the other end of the slots 27 engages the respective screws 26, the arm will fall into engagement with the end 30 of the member 28, and will position the stylus or needle 24 so as to play a 12-inch record. The movement of the arm 23 about its pivot to position the stylus 24, at the beginning of the record, is effected by gravity as the lid 11 is being raised, as during that time the arm will fall into engagement with the end 30 of the member 28, in either of the positions to which the end or stop 30 has been moved.

To operate this mechanism, the selector member 28 is first adjusted to position the end 30 thereof, according to the size of the record to be played. The arm 23 is free to swing by gravity about its pivot 22, and into contact with the end 30, when the lid 11 is raised. When the lid is closed, the stylus or needle 24 will then be in the proper position to start on the record.

The motor 13 is included in a circuit embodying conductors 31—32, and also included in the circuit is a switch or make and break device embodying a contact 33 carrier by the casing, and a contact 34 carried by the lid 11. The contact 34 is preferably influenced by a spring 35, which tends normally to project it or move it into a position that when the lid 11 is open, it will be projected to a position so that when the lid is closed, the contact 34 will engage the contact 33, to close the circuit, and will yield to permit of such action, as well as hold the contact 34 in engagement with the contact 33.

The arm 23 is electrically connected with the amplifier or cone speaker 36, in any suitable manner. The usual radio equipment (not shown) common in devices of this character, is also employed, and a switch device 37, suitably located for manual operation, makes it possible to selectively render the apparatus operable as a radio or phonograph. A radio dial 38, and control buttons or knobs 39, 40 are also provided and suitably located.

Figure 4:
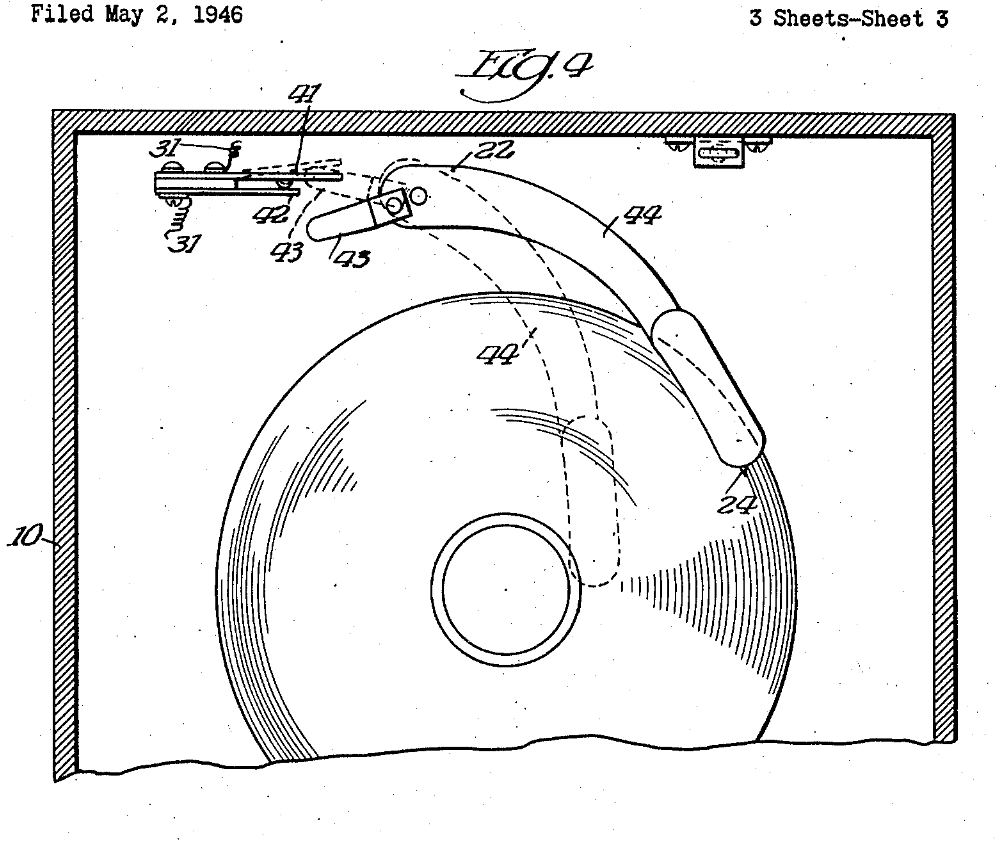
Fig. 4 is a diagrammatic view of the pickup or stylus carrying arm, and one form of control switch for the table actuating motor.
Figure 5:
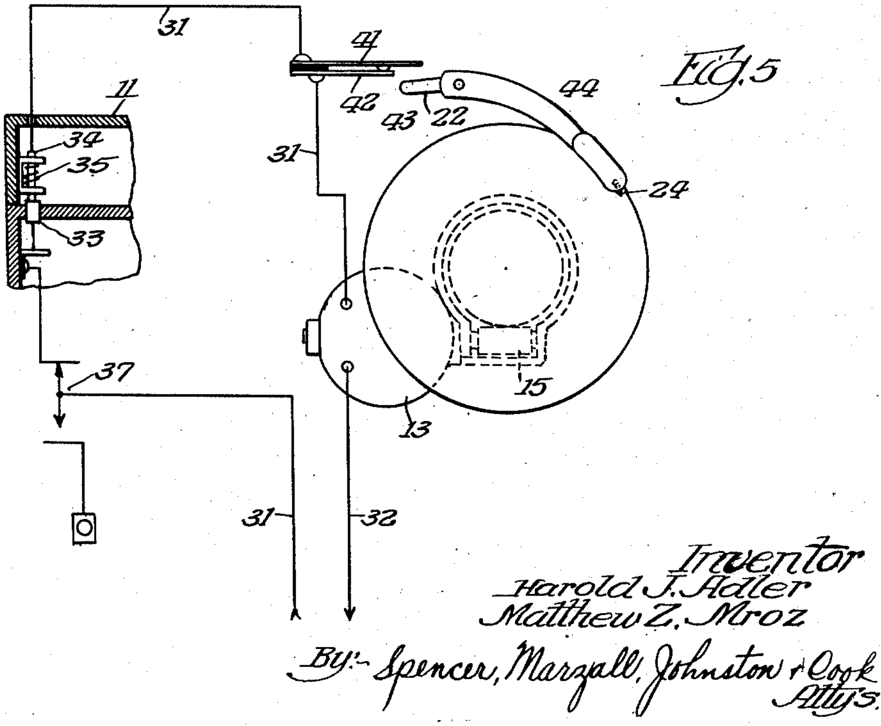
Fig. 5 is a schematic view of the pickup arm, the control mechanisms, and a wiring diagram.

In the form of the invention shown in Figs. 4 and 5, a switch or make and break device is included in the conductor 31, and preferably embodies two contact members 41—42, one of which is preferably resilient, and is movable into and out of engagement with the co-operating contact, to make and break the motor circuit to start and stop the revolving record supporting table 14.

The contact 41 is preferably longer than the contact 42, so that a portion of the former will extend into the path of movement of an extension or projection 43 on the needle or stylus carrying arm 44. This contact 41 is so positioned that the extension 43 on the arm will engage and shift it out of engagement with the contact 42, just as the stylus or needle reaches the end of the record being played.

When the lid or cover 11 is raised to change the record, the arm 44 will automatically swing by gravity to position the stylus to begin another record, and, at the same time, the extension 43 will move to a position with respect to the contact 41, to permit the latter to engage the contact 42, and thereby close the motor circuit.

With this invention, it will be manifest that the stylus carrying arm will be automatically set to a starting position upon the raising of the lid, and all operations usually performed by the operator, with the exception of opening the lid, and the placing or removal of the records, will be dispensed with. Furthermore, means are provided for selectively setting the stylus in accordance with the size or diameter of the record to be played. The apparatus is also adapted to be selectively set to perform as a phonograph, or as a radio, by the manipulation of a single control switch.

While the preferred forms of the invention have been herein shown and described, it is to be understood that various changes may be made in the construction, and in the combination and arrangement of the several parts, within the scope of the claim, without departing from the spirit of this invention.

What is claimed as new is:

A phonograph apparatus embodying a housing, a closure hingedly mounted on said housing, an electric motor, a record supporting table adapted to be rotated by said motor, a stylus carrying arm pivotally mounted upon the closure, a first switch having two normally closed contact members, one of which is longer than the other, an extension on said stylus arm for engaging the longer of said contact members to open said switch when the stylus has traversed a record on said record supporting table, and a second switch including a first contact member mounted on the closure and a second contact member mounted on the housing, whereby said second switch is opened when said closure is raised, and is closed when said closure is lowered to closing position, said first switch and said second switch being electrically connected in series with said motor whereby opening of either switch will de-energize said motor whereupon rotation of said record supporting table will cease.

HAROLD J. ADLER.
MATTHEW Z. MROZ.

REFERENCES CITED

The following references are of record in the file of this patent:

UNITED STATES PATENTS

| Number | Name | Date |
|---|---|---|
| 1,429,839 | Boswell | Sept. 19, 1922 |
| 1,711,666 | Adams | May 7, 1929 |
| 2,114,741 | Hill | Apr. 19, 1938 |
| 2,166,986 | Dally | July 25, 1939 |
| 2,219,230 | Krause | Oct. 22, 1940 |